United States Patent
Kuo

[11] Patent Number: 5,758,975
[45] Date of Patent: Jun. 2, 1998

[54] FOUR-WAY LINEAR BALL SLIDING GUIDE

[76] Inventor: Chang-Hsin Kuo, No. 46, 37th Rd., Taichung Industrial Park, Taichung, Taiwan

[21] Appl. No.: 851,074

[22] Filed: May 5, 1997

[51] Int. Cl.[6] ............................................. F16C 29/06
[52] U.S. Cl. ................................................ 384/45
[58] Field of Search .......................... 384/45, 44, 43; 464/164

[56] References Cited

U.S. PATENT DOCUMENTS

| | | | |
|---|---|---|---|
| 5,439,294 | 8/1995 | Rixen et al. | 384/45 |
| 5,492,412 | 2/1996 | Tsukada | 384/45 |
| 5,562,346 | 10/1996 | Kuo | 384/45 |

*Primary Examiner*—Lenard A. Footland
*Attorney, Agent, or Firm*—David & Raymond; Raymond Y. Chan

[57] ABSTRACT

A four-way linear ball sliding guide includes four rows of steel balls held in four troughs which are positioned diagonally with each other. Each trough is connected to an arched circulation path. Effective steel ball sliding guide hence has greater loading rating and stiffness. The steel balls can move smoothly in the trough and the circulation path.

2 Claims, 9 Drawing Sheets

FIG. 17 of# FOUR-WAY LINEAR BALL SLIDING GUIDE

BACKGROUND OF THE INVENTION

1. Field of the Invention

This invention relates to a linear ball sliding guide and particularly to a linear ball sliding guide which has four rows of steel balls for supporting heavy load.

2. Description of the Prior Art

Figure 16:
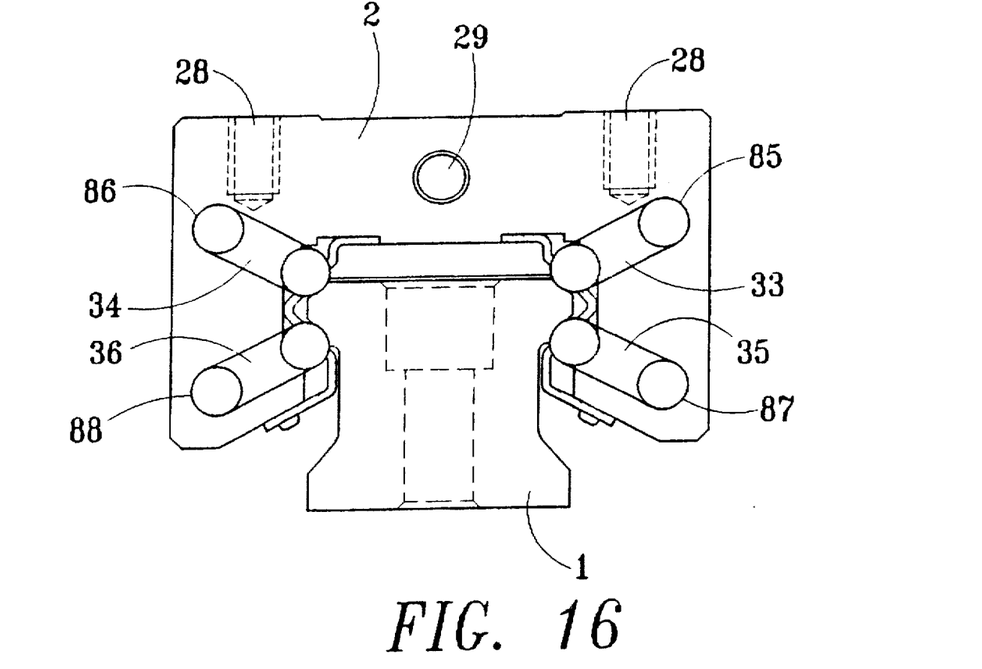
FIG. 16 is a front view of a conventional linear ball sliding guide.
Figure 17:
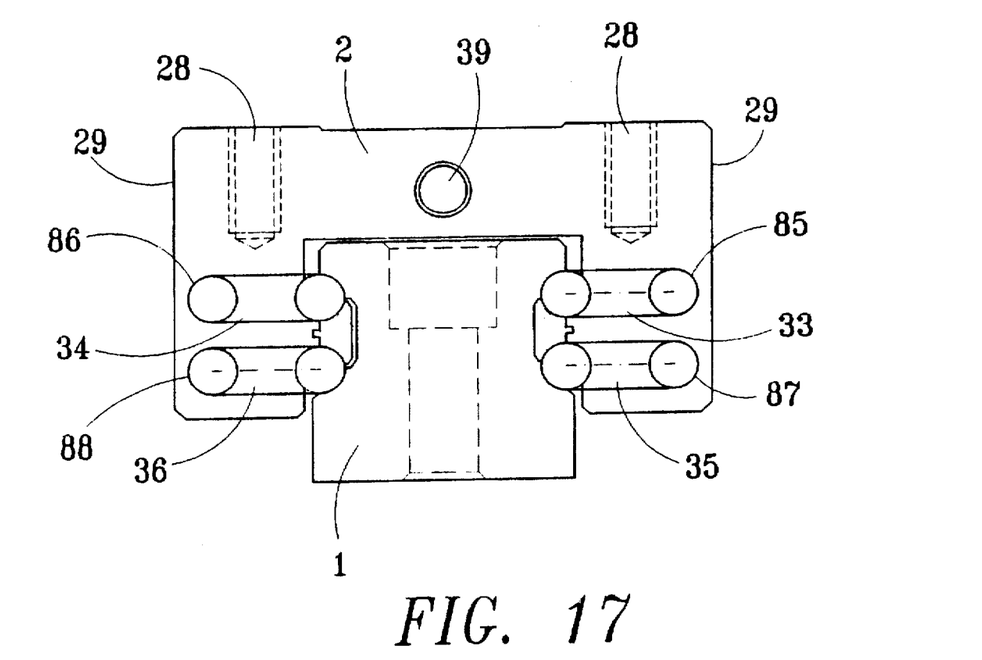
FIG. 17 is a front view of another conventional linear ball sliding guide.

Linear ball sliding guide has been widely used in precision machineries and instruments. With increasing demand for miniaturization, the need for small size and heavy load linear ball sliding guide in growing. FIGS. 16 and 17 show two prior arts of conventional linear ball sliding guide. In FIG. 16, the connection paths 33,34,35 and 36 are substantially being formed radially. In order to prevent the circulation holes 85 and 86 from interfering with the screw hole 28, the thickness of the sliding block 2 has to increase. It consequently increase the total height of the sliding guide and limits its applicability. The stability of the sliding guide also is impaired. In FIG. 17, the connection paths 33,34,35 and 36 are substantially horizontal. The allowable circulation holes 85,86,87 and 88 hitting the side wall 29 of the sliding block, it usually uses small size steel balls. The basic dynamic and static load rating, and stiffness of the sliding guide will be severely downgraded. Another alternative is not reduce the size of the steel ball, but to reduce the width of the guide rail. This approach also will reduce the strength and stiffness.

SUMMARY OF THE INVENTION

In view of aforesaid disadvantages, it is an object of this invention to provide a four way linear ball sliding guide which offers heavy load rating and high stiffness without increasing the size of the sliding guide. To achieve this object, this invention has your arched connection paths. The reaction force between the steel balls and a trough is about 45 degrees. The arched connection path can increase the circulation length and avoid the interference with the screw hole. With increased circulation length, this invention is able to provide higher loading capacity and stiffness. This invention also provides an improved end plate for the sliding block. It can facilitate precise positioning during assembly. It can also improve the smoothness of steel ball circulation.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
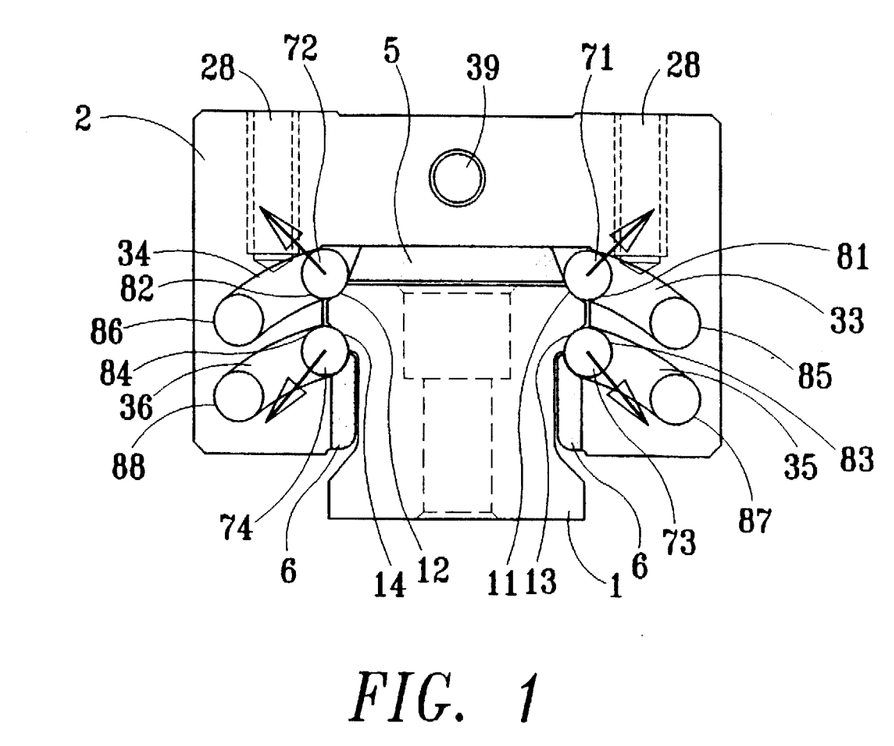
FIG. 1 is a front view of this invention.
Figure 2:
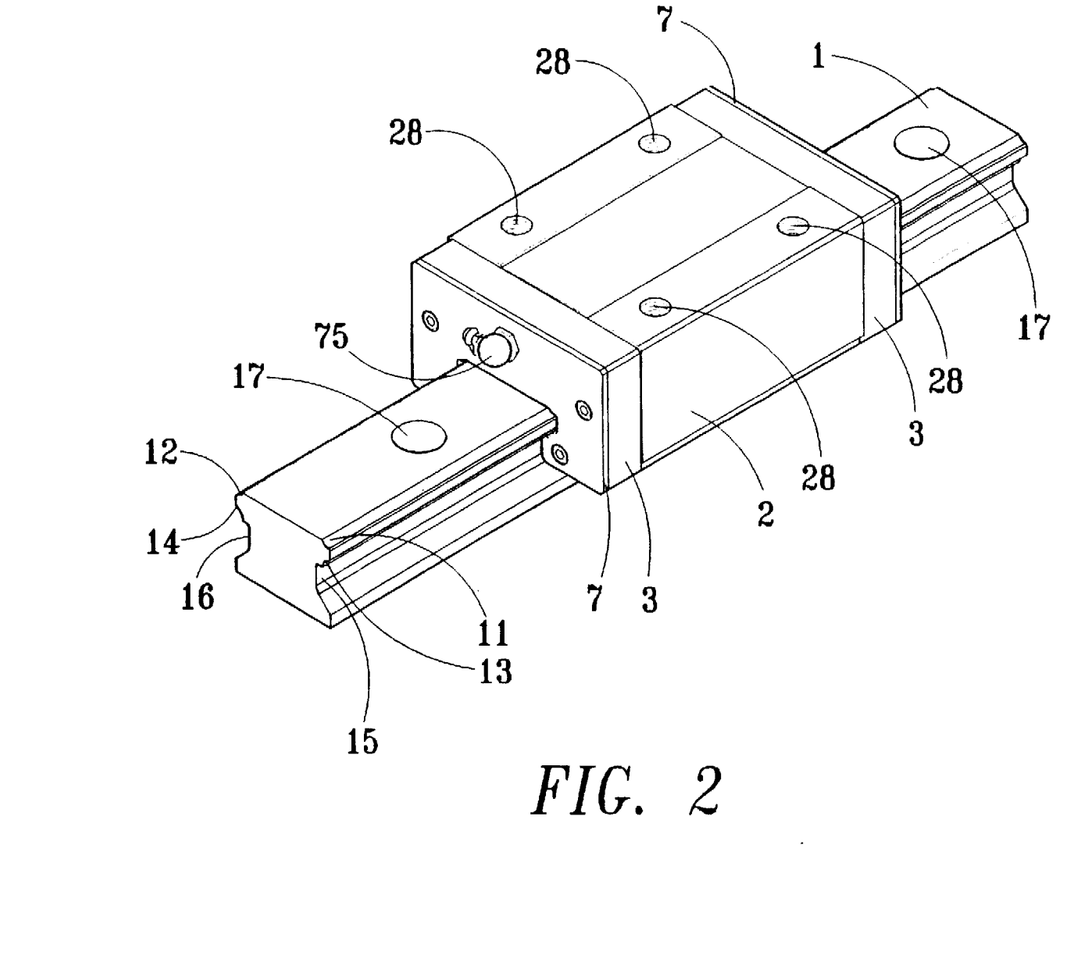
FIG. 2 is a perspective view of this invention.

Referring to FIGS. 1 and 2, the linear ball sliding guide according to this invention includes a rail 1 formed in general an "T" cross section which has four troughs 11,12, 13 and 14 formed on an upper section, a sliding block 2, a "M" shape member which has four troughs 81,82,83 and 84 mating respectively with the troughs 11, 12, 13 and 14 for holding steel balls there between. The steel balls serve as load transmitting media. Steel ball 71 on the top right position contacts with the trough 81 at a 45 degree angle in a top-right direction (as shown by an arrow in FIG. 1) and contacts with the trough 11 at a 45 degree angle in a bottom-left direction.

Consequently the force between the steel ball 71 and the sliding block 2 is in the direction of 45 degree in top-right direction. Similar force and direction relationship is applicable to other steel balls, except that the direction of the angle is different. E.g. the steel ball 72 has a force at 45 degree toward the top-left direction, the steel ball 73 has a force at 45 degree toward the bottom-right direction and the steel ball 74 has a force at 45 degree toward the bottom-left direction. The connection paths 33,34, 35 and 36 are substantially horizontal at the juncture with the troughs, but are about 45 degree against the force direction. The connection paths 33, 34, 35 and 36 are further formed in arched shape. By so doing, the path length is increased and can make the steel ball circulating movement most smoothly. A bigger size steel ball may also be used and thus improving the load rating at stiffness of the sliding guide. The arched connection path can further avoid the interference between the screw hole 28 and the circulation holes 85 and 86. The sliding block also has a screw hole 39 for engaging with a lubrication nozzle.

Figure 3:
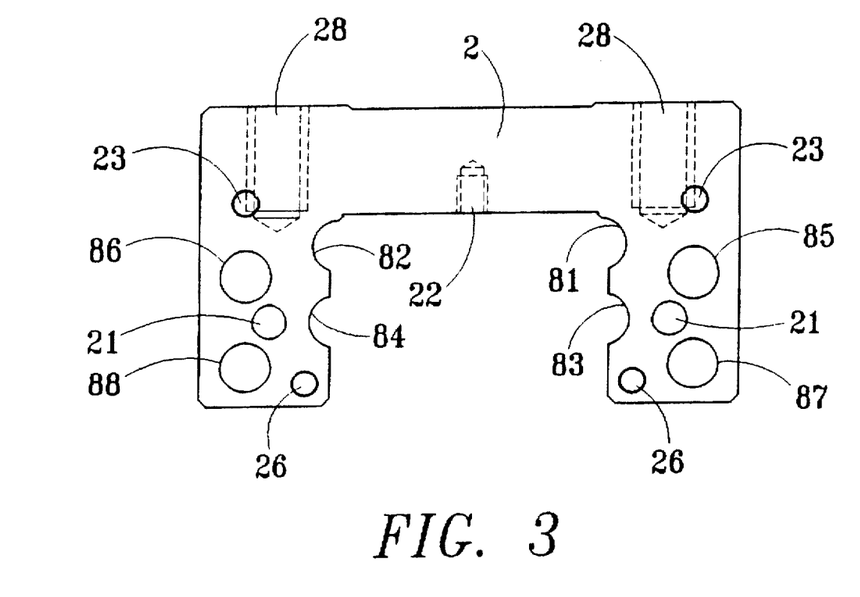
FIG. 3 is a front view of a sliding block of this invention.
Figure 4:
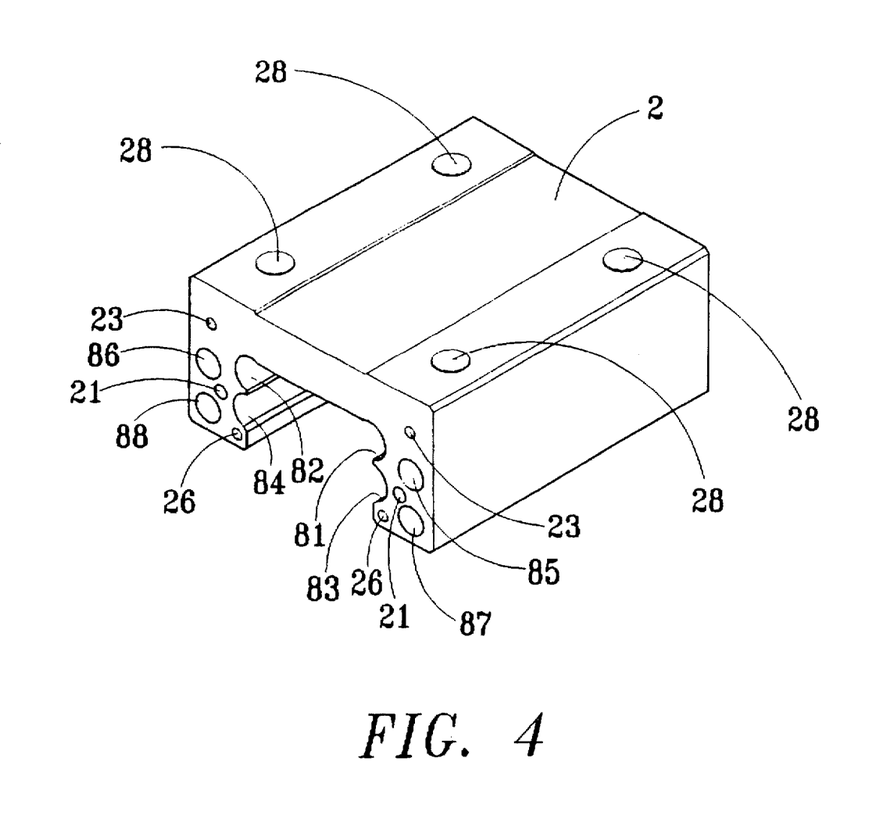
FIG. 4 is a perspective view of a sliding block.

Referring to FIGS. 3 and 4, the sliding block 2 has four curved troughs 81,82 83 and 84 formed therein. The curvature of the troughs is slightly larger than the steel ball diameter so that the steel balls can move smoothly therein and to carry the load applied thereon. There are circulation holes 85, 86 87 and 88 for steel balls to loop therein freely. Holes 21 are for positioning of a guiding block. Screw hole 22 is for fixing a top retainer while screw hole 26 is for fixing a side retainer.

Figure 5:
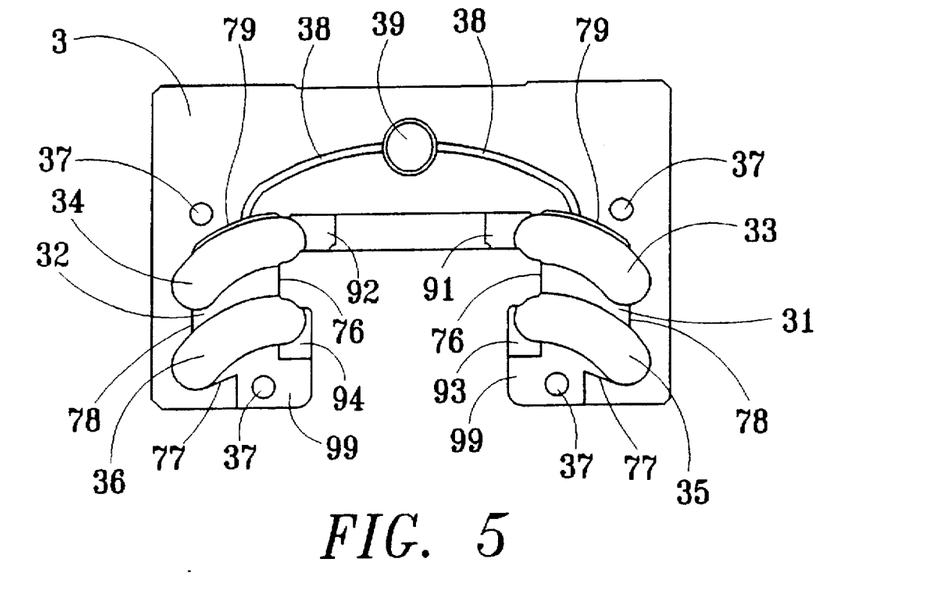
FIG. 5 is a front view of an end plate of this invention.
Figure 6:
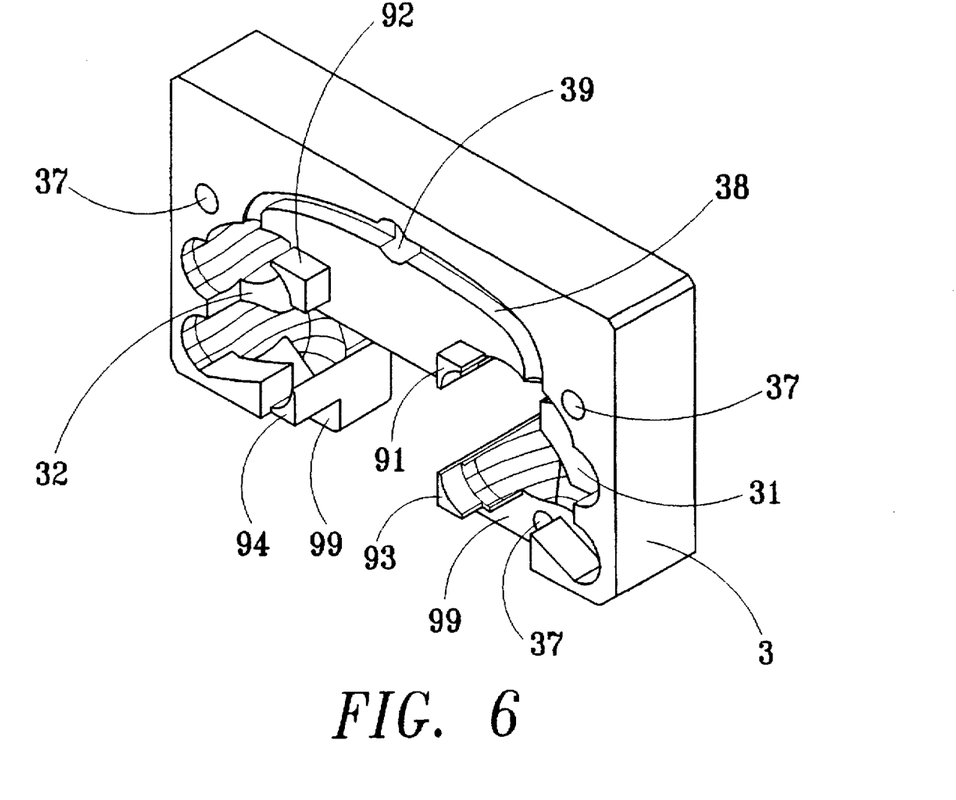
FIG. 6 is a perspective view of an end plate.

Referring to FIG. 5 and 6, an end plate 3 has cavities 31 and 32 located on two lateral walls. Each cavity 31 or 32 has a plane bottom surface 77, a pair of plane lateral surfaces 76,78 and a curved top surface 79. The cavity 31 and 32 are formed to hold a guiding block 4. There are four protrusive studs 91,92,93 and 94 on one side of the end plate 3 for firmly engaging with the sliding block 2 (also refer to FIG. 6)

The steel balls in the troughs 81,82,83 and 84 then can be guided by the studs 91,92,93 and 94 to enter smoothing in the circulation loop. To avoid the interference of studs 91.92.93 and 94 with the rail 1, the rail 1 has concave lateral surfaces (as shown by 15 and 16 in FIG. 2). An oil passage 38 is formed between the screw hole 39 and top surface 79 in the end place 3 for routing lubricating oil into the cavity 31 and 32. The end place 3 is screwed to the sliding block through screw holes 37 and 23 and 26.

Figure 7:
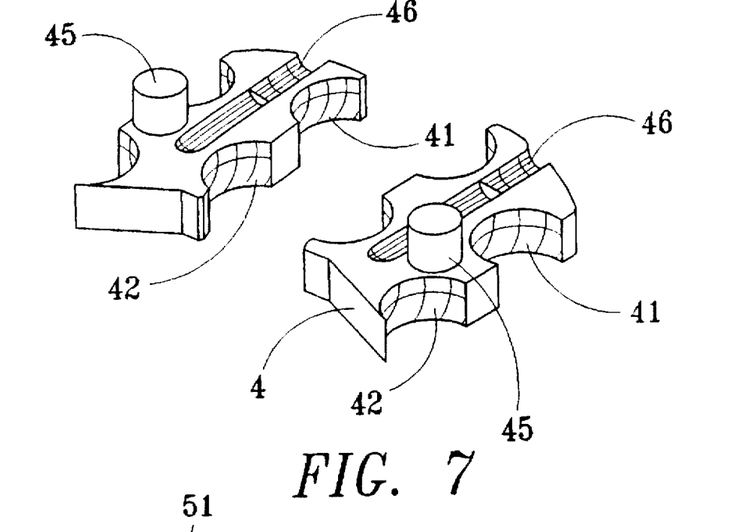
FIG. 7 is a perspective view of a pair of guiding blocks.

Referring to FIG. 7, a guiding block 4 has two guiding troughs 42.42 for routing two rows of steel balls. There is a positioning pin 45 to engage with the position hole 21 in the sliding block 2 for precise positioning. Groove 46 is for accepting lubrication oil.

Figures 8, 9:
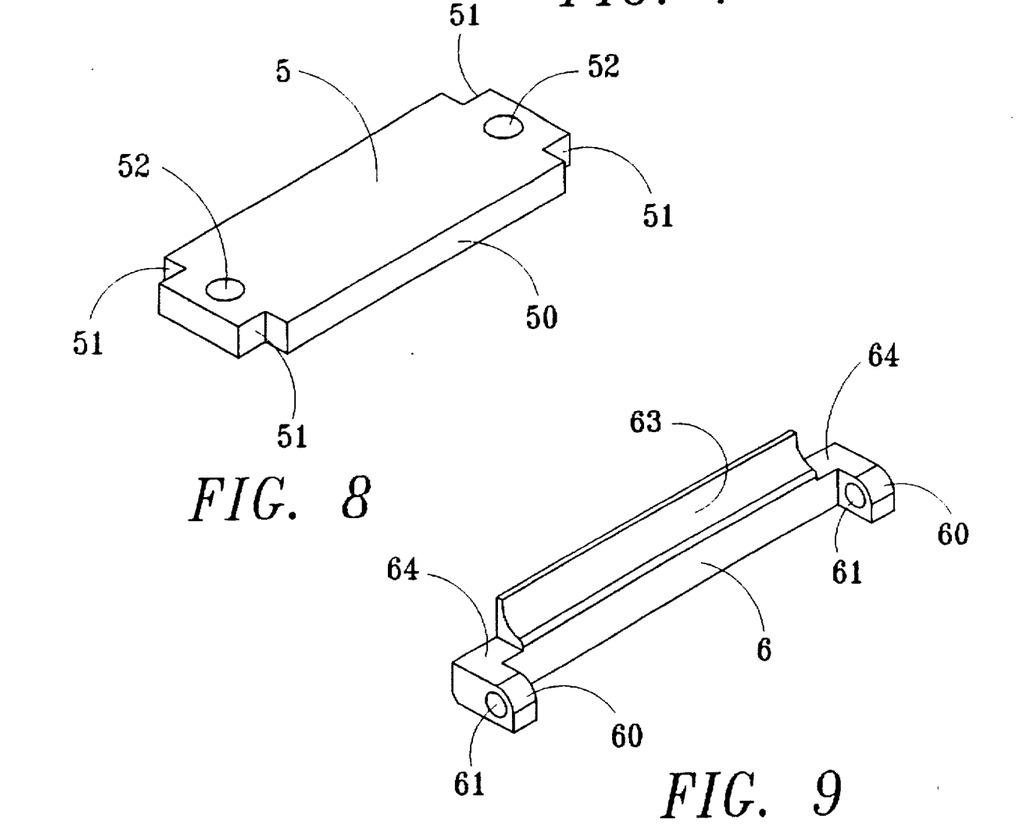
FIG. 8 is a perspective view of a top retainer.
FIG. 9 is a perspective view of a side retainer.

FIG. 8 show a top retainer 5 and FIG. 9 shows a side retainer 6. Both are to hold the steel balls in the troughs 81.82.83 and 84 when the sliding block 2 is moved away from the rail 1. The lateral surface 59 is to keep the steel ball from falling off. Cut corners 51 are provided to move against the studs 91 and 92. Screw holes 52 are mating against the screw boles 22 in the sliding block for screwing and engaging use.

Side retainer 6 has a curved flange 63 for keeping the steel balls from falling off the troughs 83 and 84.

Figure 11:
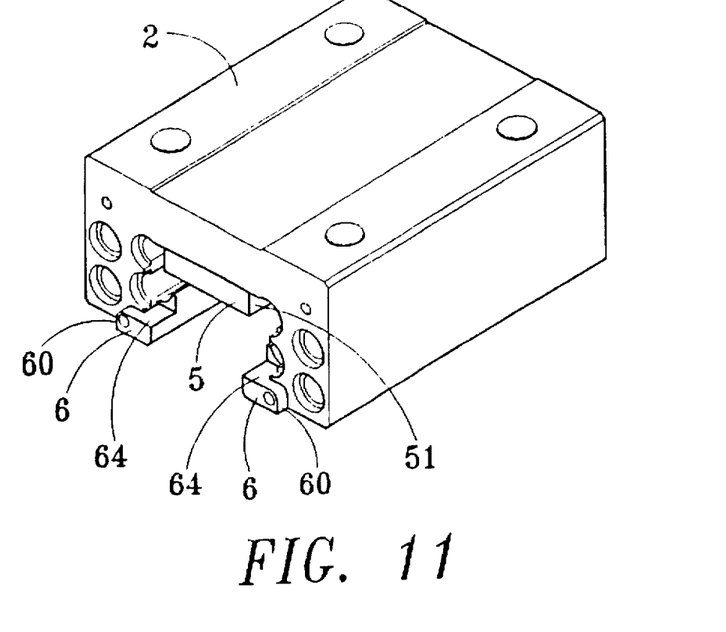
FIG. 11 is a perspective view of a subassembly of a sliding block and a top and a side retainers.

A part of ears 60 are provided to latch on the sliding block 2 at two ends. Screw holes 61 are for screwing the side retainer 6 to the sliding block 2. FIG. 11 illustrates the subassembly of the sliding block with a top and a side retainer in place. The side retainer 6 also has prior of cut ends 64 to mate against the studs 93 and 94. The end place 3 has a cut off 99 to louse the ear 60 of the side retainer 6.

Figure 10:
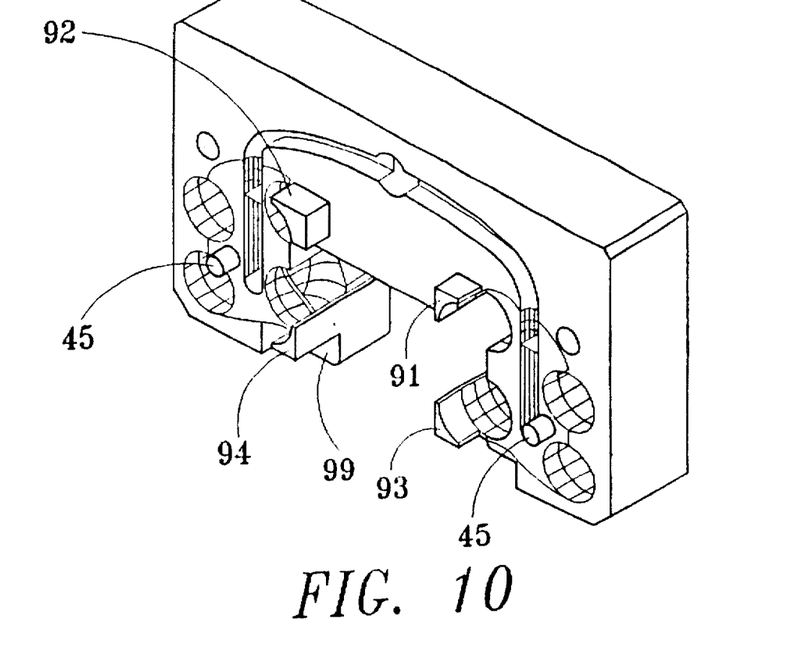
FIG. 10 is a perspective view of a subassembly of an end plate and a pair of guiding blocks.

FIG. 10 illustrates a subassembly of the end plate 3 and a part of guiding block 4. With positioning pin 45 mates against the positioning hole 21, the subassembly can engage precisely with the sliding block 2. The studs 91.92.93 and 94 can guide the steel balls moving smoothing in the circulation loop. The troughs in the sliding block do not need further * detour. Total effective trough length is thus increased. This will result in greater load rating and higher stiffness.

Figure 12:
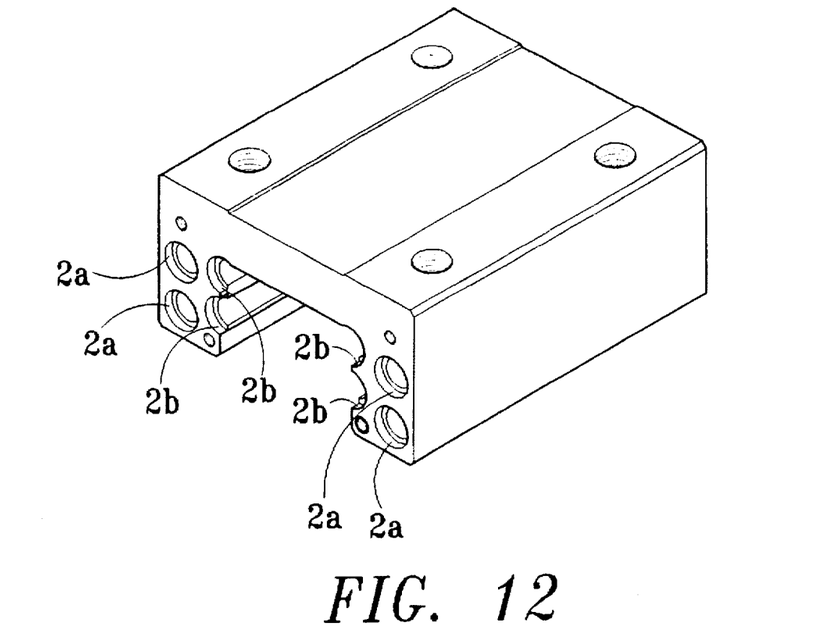
FIG. 12 is a perspective view of another embodiment of a sliding block.
Figure 13:
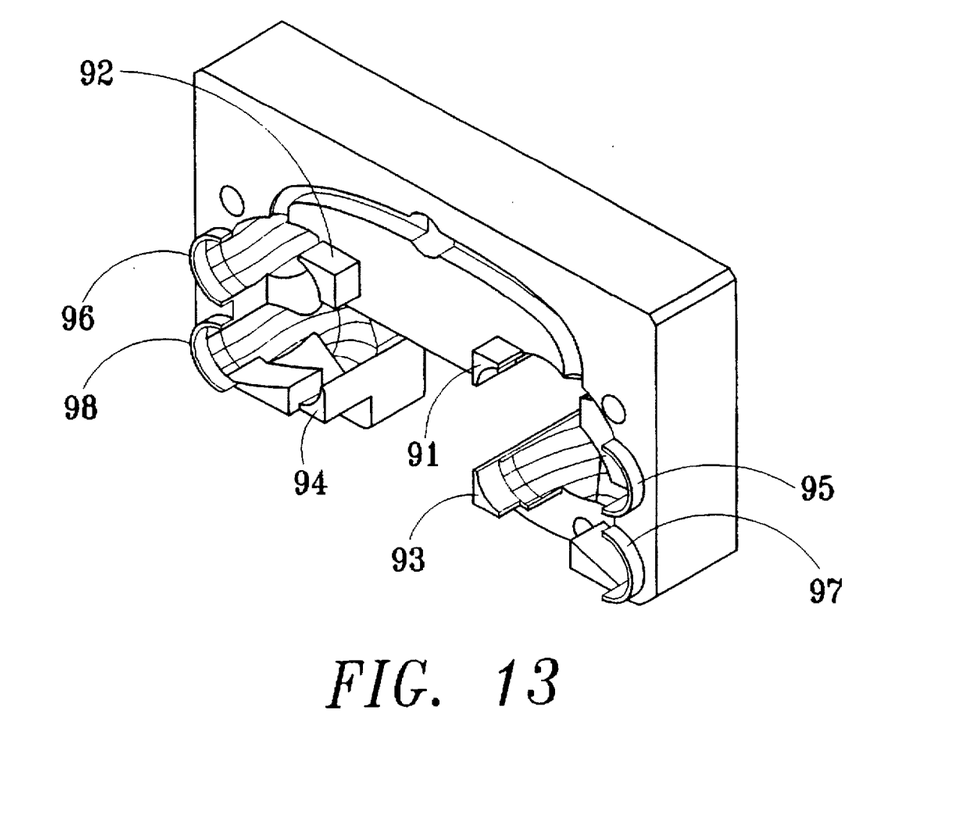
FIG. 13 is a perspective view of another embodiment of an end plate.

FIG. 12 shows another embodiment of this invention. The sliding block is generally structured like the one shown in FIG. 3 and 4. However the circulation hole has milled with a fish eye opening 2a and 26 for positioning purpose. The end plate 3 also has the cavities 31 and 32, and four connection paths 33.34.35 and 36, and studs 91.92.93 and 94. However at the circulation holes, there are provided with curved flanges 95.96.97 and 98 (shown in FIG. 13)

Figure 14:
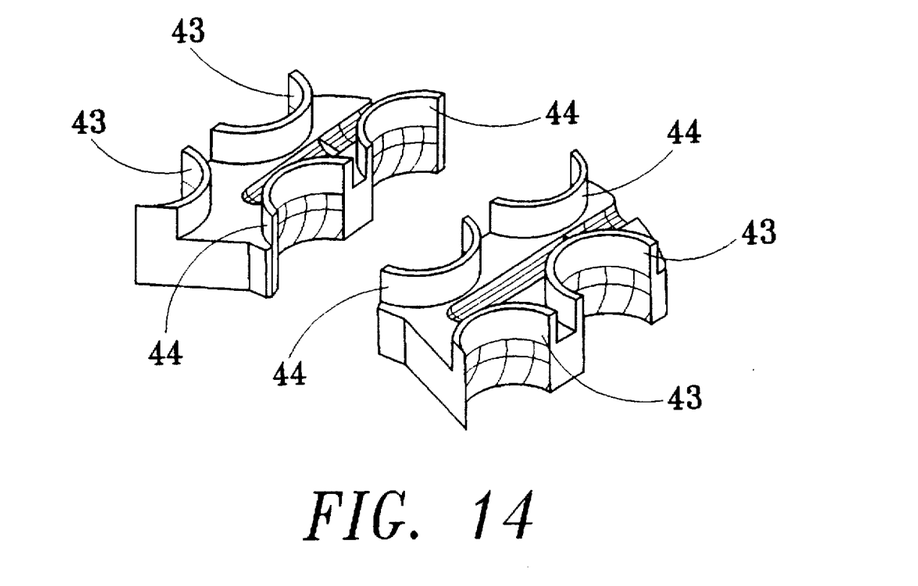
FIG. 14 is a perspective view of another embodiment of a guiding block.
Figure 15:
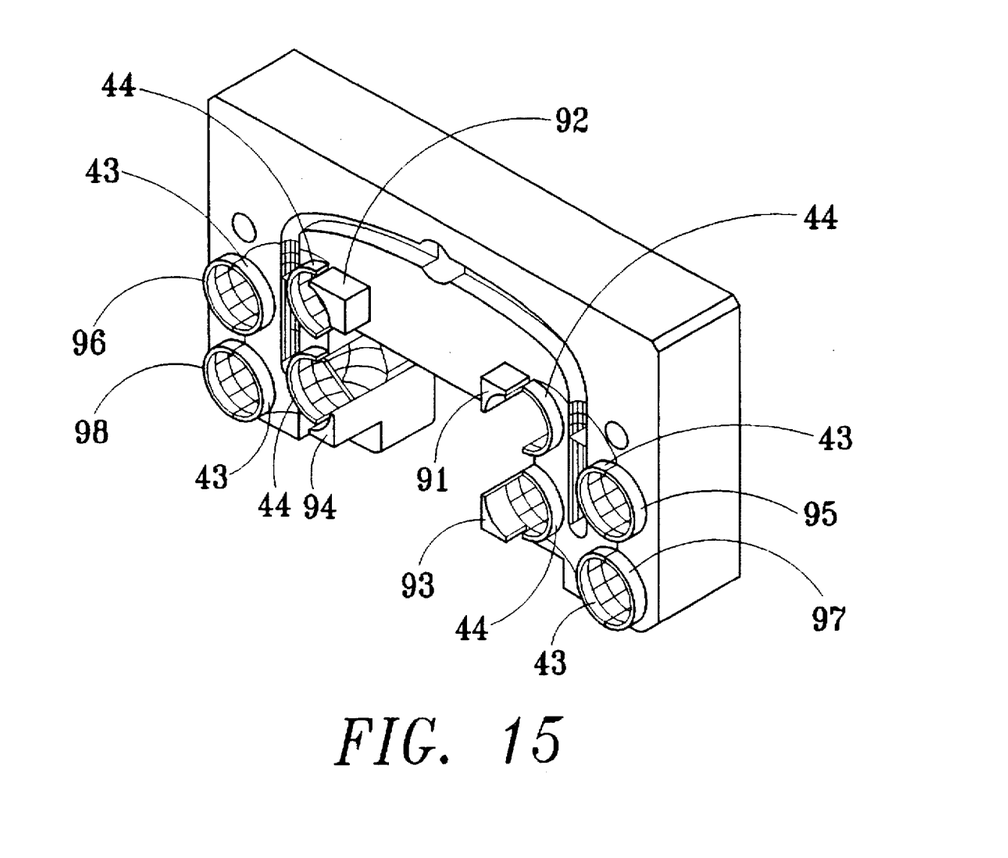
FIG. 15 is a perspective view of another embodiment of a sliding block subassembly, shown in FIGS. 12, 13 and 14.

The guiding block (FIG. 14) has positioning flanges 43 and 44, but has no positioning pin 45. FIG. 15 shows the subassembly of this embodiment. Flanges 43.95.96.97 and 98 engage with the fish eye hole 2a, while flange 44 engages with the fish eye hole 26. Thus the end plate can engage precisely with the sliding block. The steel balls therefore can more smoothly in the circulation loop.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur are intended to cover all embodiments which do not depart from the spirit and scope of the invention.

What is claimed is:

1. A four-way linear ball sliding guide comprising:

a rail having a narrow and concave middle cross section a head section having four first arched troughs formed respectively in a top-right, a top-left, a bottom-right and a bottom-left corner;

a slidingly block sliding engageable with the rail having four circulation holes for steel balls to more there through, with two positioning holes and four second arched troughs for holding the steel balls therebetween, the first and the second arched troughs having a curvature larger than the diameter of the steel ball, the second arched trough opposite the top-right corner receiving force from the steel balls at about 45 degree in top-right direction, the second arched trough opposite the top-left corner receiving force from the steel balls at about 45 degree in top-left direction, the second arched trough opposite the top-left corner receiving force from the steel trough opposite the bottom-let corner receiving force from the steel balls at about 45 degrees in bottom-right direction, and the second arched trough opposite the bottom-left corner receiving force from the steel balls at about 45 degrees in bottom-left direction;

a pair of end plates located respectively at two ends of the sliding block having four curved connection plates communicating respectively with the arched troughs for the steel balls to move there through, two substantially rectangular cavities located at two lateral sides thereat, each cavity bordering two connection paths at one lateral side and four protrusive studs located beside the juncture of the connection path and the trough;

four guiding blocks located respectively in the cavities, each guiding block having two guiding troughs for guiding the steel balls moving into the connection paths, each guiding block having a positioning pin engaging with a position hole in the sliding block;

two side retainers located respectively on two lateral sides of the sliding block having a curved flange for holding the steel balls in the first and second arched troughs at the bottom; and a top retainer located under the bottom of a middle section of the sliding block for holding the steel balls in the first and second arched troughs at the top.

2. A four-way linear ball sliding guide of claim 1, wherein the circulation hole and each of two ends of the first and second arched troughs being formed with a fish eye hole; the connection of the end plate has a curved flange engageable with the fish eye hole.

* * * * *